(12) United States Patent
Okubo

(10) Patent No.: US 7,205,686 B2
(45) Date of Patent: Apr. 17, 2007

(54) LINEAR ACTUATOR

(75) Inventor: Masashi Okubo, Nagano (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 146 days.

(21) Appl. No.: 11/086,918

(22) Filed: Mar. 23, 2005

(65) Prior Publication Data

US 2005/0212363 A1   Sep. 29, 2005

(30) Foreign Application Priority Data

Mar. 24, 2004   (JP)   ............................. 2004-086292
Feb. 15, 2005   (JP)   ............................. 2005-037803

(51) Int. Cl.
*H02K 41/00*   (2006.01)
*H02K 35/00*   (2006.01)
*H02K 33/00*   (2006.01)
*H01F 3/00*    (2006.01)
*H01F 7/00*    (2006.01)

(52) U.S. Cl. .............................. 310/15; 310/12; 310/17

(58) Field of Classification Search ............ 310/12–15, 310/17, 23, 27, 28, 30–35; 335/229–235, 335/251, 255
See application file for complete search history.

(56) References Cited

U.S. PATENT DOCUMENTS 4,363,980 A * 12/1982 Petersen ..................... 310/15
4,542,311 A *  9/1985 Newman et al. ............. 310/13
4,924,123 A *  5/1990 Hamajima et al. ........... 310/15
5,057,723 A * 10/1991 Umehara et al. ............. 310/12
5,099,158 A *  3/1992 Stuart et al. ................. 310/14
5,317,221 A *  5/1994 Kubo et al. .................. 310/12
5,896,076 A *  4/1999 van Namen ................ 335/229
6,657,326 B1* 12/2003 Yamamoto et al. .......... 310/12

FOREIGN PATENT DOCUMENTS

JP        5583453    *  6/1980   ................. 310/15
JP        1164256    *  6/1989   ................. 310/15
JP      06-133523 A     5/1994

* cited by examiner

*Primary Examiner*—Tran Nguyen
(74) *Attorney, Agent, or Firm*—Birch, Stewart, Kolasch & Birch, LLP

(57) ABSTRACT

A linear actuator has improved output performance and can be assembled with high precision. The linear actuator includes: a yoke part where yoke components, where a hollow is formed between an outer circumferential surface of a first yoke provided on one side of a ring-shaped permanent magnet and an inner circumferential surface of a second yoke provided on another side of the ring-shaped permanent magnet, are combined on an outer circumference of a guide pipe with end surfaces of the first yokes and/or end surfaces of the second yokes being in contact and magnetic poles formed in facing yoke surfaces having a same polarity; and a shaft-linked part where a coil bobbin, which is disposed in the hollow of the yoke part and around which a coil has been wound, and a shaft inserted into the guide pipe are linked. By switching the direction of the current flowing in the coil, relative movement between the yoke part and the shaft-linked part is reciprocally caused in an axial direction.

7 Claims, 12 Drawing Sheets

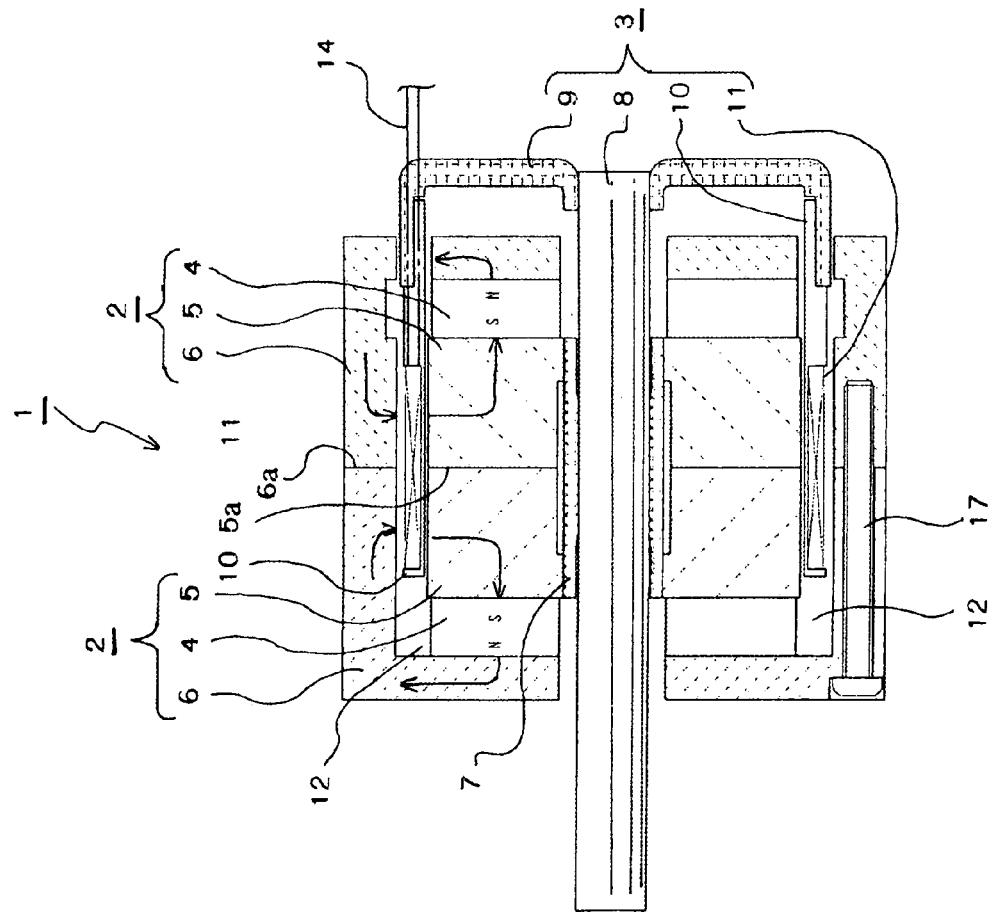
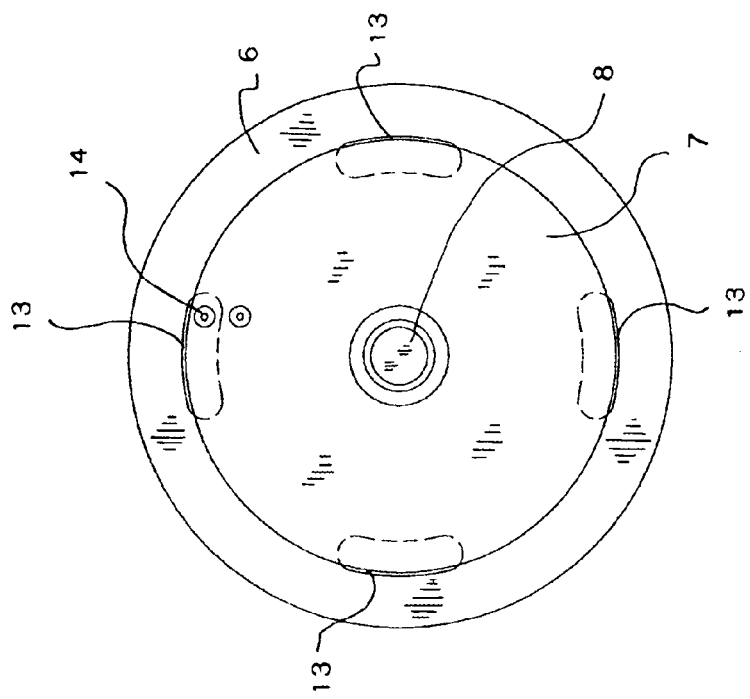
FIG.1A
FIG.1B

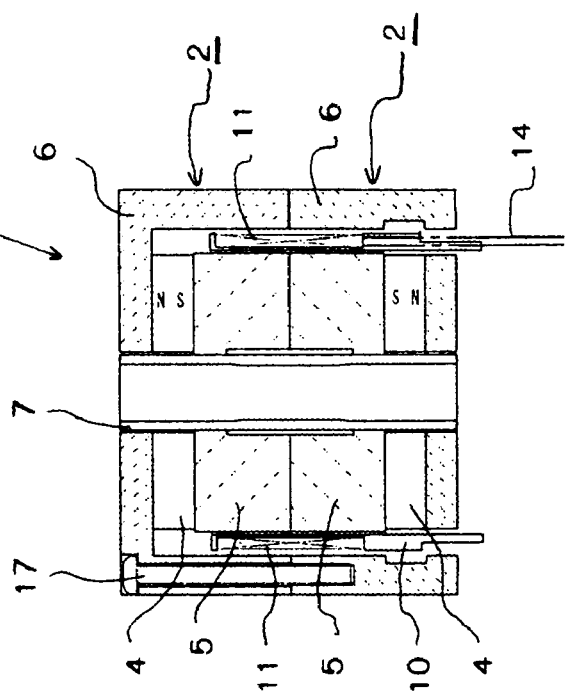
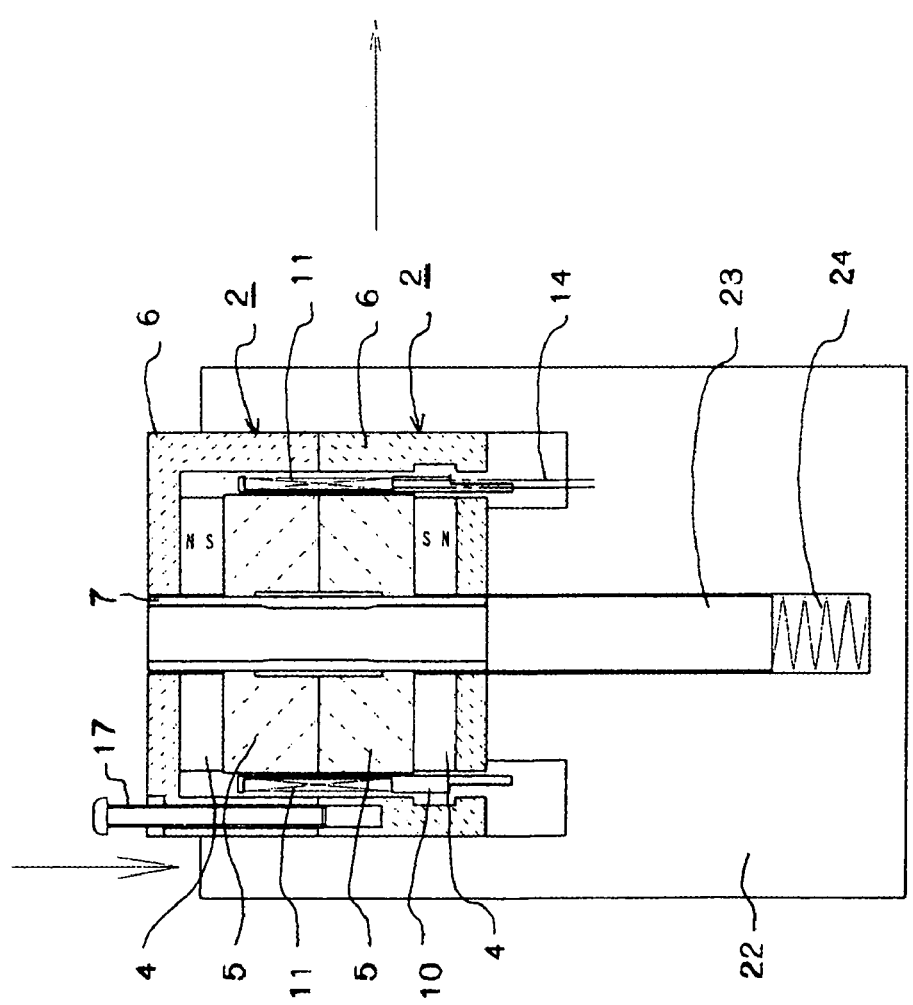
FIG.5B
FIG.5A

Section A-B

LINEAR ACTUATOR

BACKGROUND OF THE INVENTION

1. Field of the Invention

The present invention relates to a voice coil linear actuator and in particular to a small, high-performance linear actuator used in a hydraulic/pneumatic control apparatus or in a precise positioning device such as a hard disk drive.

2. Related Art

One example of a conventional linear actuator will be described with reference to FIG. 13. As a fixed part, a yoke part 55 is formed by disposing a pair of ring-shaped permanent magnets 51 with the same poles facing one another, disposing a pole shoe 52 on one side of each magnet 51 and a side yoke 53 on the other sides, and disposing a tubular yoke 54 between the respective side yokes 53. As a moving part, a coil support 56 is provided in a hollow 61 provided between the facing pole shoes 52 of the yoke part 55. On the outer circumference of the coil support 56, a coil bobbin 57 is disposed in a gap 62 between the circumferential surfaces of the pole shoes 52 and an inner circumferential surface of the tubular yoke 54, with a moving coil 58 being wound around the coil bobbin 57. A cylindrical output shaft 59 is integrally fitted onto inner circumferential surfaces of the coil supports 56. The output shaft 59 passes through the yoke part 55 and is supported via bearings 60 provided in the through-hole between the side yokes 53 on both sides so as to be slidable. A lead wire 63 for supplying electricity to the moving coil 58 is disposed via an internal space in the output shaft 59 and the hollow 61.

When a current flows through the moving coil 58, thrust is produced in the coil support 56 and the output shaft 59 in the axial direction due to an electromagnetic force received in a direction perpendicular to the magnetic fields formed by the magnetic circuits in the yoke part 55 (i.e., the magnetic fields formed between the outer circumferential surfaces of the pole shoes 52 and the inner circumferential surface of the tubular yoke 54), and by switching the direction in which the current flows through the moving coil 58, the output shaft 59 is moved reciprocally in the axial direction (see Japanese Laid-Open Patent Publication No. H06-133523).

In the linear actuator shown in FIG. 13 described above, the coil support 56 is disposed in the hollow 61 provided between the ring-shaped pole shoes 52, and since the range of movement of the output shaft 59 is restricted by this hollow 61, it is not possible to reduce the gap between the two pole shoes 52, thereby placing a limit on miniaturization. Also, in the magnetic circuits formed in the yoke part 55 in rings from the permanent magnets 51, in addition to the magnetic flux produced between the pole shoes 52 and the tubular yoke 54, magnetic flux that leaks from end surfaces aside from the outer circumferential surfaces of the pole shoes 52 is produced. Although the amount of magnetic flux that interlinks the moving coil 58 and the leak magnetic flux produced from end surfaces aside from the outer circumferential surfaces of the pole shoes 52 is low, the direction of interlinking with the moving coil 58 is not necessarily perpendicular and electromagnetic force components in directions aside from the axial direction act upon the moving coil 58, so that the thrust of the moving part (the coil support 56 and the output shaft 59) is reduced and vibration is produced in the moving part in the radial direction.

The output shaft 59 is supported by the bearings 60 provided in through-holes of the side yokes 53, and the yoke part 55 is formed by attaching the tubular yoke 54 so as to fit within the outer diameter of the side yokes 53, with the pole shoes 52 and the side yokes 53 being coaxially attached to the ring-shaped permanent magnets 51. In this way, since the positions used for alignment when assembling the respective components that form the yoke part 55 differ, it is difficult to assemble the parts so that favorable coaxial alignment with the output shaft 59 is maintained for the outer circumferential surfaces of the pole shoes 52 and the inner circumferential surface of the tubular yoke 54. This means that it is difficult to accurately maintain the position and posture of the coil bobbin 57 and the moving coil 58 provided in the gap between the outer circumferential surfaces of the pole shoes 52 and the inner circumferential surface of the tubular yoke 54. Therefore, to prevent the yoke part 55 from interfering with the coil bobbin 57 and the moving coil 58, it is necessary to increase the clearance between the coil bobbin 57 and the pole shoes 52 and tubular yoke 54. However, if the gap between the pole shoes 52 and the tubular yoke 54 is increased, the leak magnetic flux from the magnetic circuits increases, so that a large thrust cannot be produced in the moving part in the axial direction.

To achieve a sufficient movement range for the coil support 56, it is necessary to attach the pole shoes 52 and the side yokes 53 to the permanent magnets 51 so that the ring-shaped pole shoes 52 disposed on both sides have a gap in between. In view of decreases in magnetic characteristics of the magnets and corrosion resistance, bonding using adhesive is normally used as the means of attachment between magnet 51 and yokes (pole shoes 52 and side yoke 53). However, to reliably harden the adhesive and maintain a sufficient bonding strength, it becomes necessary to carry out a heat treatment on the bonded parts, so that there is the problem that the number of assembly processes and assembly time increase, resulting in low productivity.

Also, as shown in FIG. 14, the output shaft 59 of the moving part is inserted through a guide pipe 64 fixed to a fixed yoke (not shown), so that when the output shaft 59 is guided by the guide pipe 64 and moves reciprocally in the axial direction, the output shaft 59 slides on the inner wall surface of the guide pipe 64. At this time, there is the risk of the output shaft 59 becoming inclined and sliding in point contact near openings 65 at both ends of the guide pipe 64. If this happens, the load is concentrated at the contacting parts of the guide pipe 64 and the output shaft 59, which accelerates abrasion.

SUMMARY OF THE INVENTION

The present invention was conceived to solve the above problems, and it is an object of the present invention to provide a linear actuator that can be assembled with high precision and where a yoke part can be miniaturized and the output performance can be improved by reducing leak magnetic flux of magnetic circuits formed in the yoke part.

To achieve the above object, a linear actuator according to the present invention produces thrust in a moving part by electromagnetic force that acts in a direction perpendicular to a direction of a current flowing in a coil and to a magnetic field formed in a yoke part, the linear actuator including: a yoke part where yoke components, where a hollow is formed between an outer circumferential surface of a first yoke provided on one side of a ring-shaped permanent magnet and an inner circumferential surface of a second yoke provided on another side of the ring-shaped permanent magnet, are combined on an outer circumference of a guide pipe with end surfaces of the first yokes and/or end surfaces of the second yokes being in contact and magnetic poles formed in facing yoke surfaces having a same polarity; and a shaft-linked part where a coil bobbin, which is disposed in the hollow of the yoke part and around which a coil has been wound, and a shaft inserted into the guide pipe are linked, wherein by switching the direction of the current flowing in the coil, relative movement between the yoke part and the shaft-linked part is reciprocally caused in an axial direction.

The linear actuator may include, in place of the yoke part described above, a yoke part produced by combining, on an outer circumference of a guide pipe, yoke components in each of which a first yoke is provided on one side of a ring-shaped permanent magnet and a second yoke with a larger diameter than the first yoke is provided on another surface of the ring-shaped permanent magnet, a hollow being formed between an inner circumferential surface of a tubular third yoke, which is disposed between the second yokes of the yoke components, and outer circumferential surfaces of the first yokes, and magnetic poles formed in end surfaces of the adjacent first yoke surfaces having a same polarity.

The shaft-linked part may include one or a plurality of coil supports, one end of each of which passes through openings formed in at least one of the second yokes and is connected to the coil bobbin and another end of each of which is linked to the shaft.

Also, in the yoke part, yoke components, which have been integrated by magnetic attraction by magnetizing in a coaxially positioned state where the first yoke has been stacked on one end of the permanent magnet and the second yoke has been stacked on another end of the permanent magnet, may be combined on the outer circumference of the guide pipe.

In the yoke part, a first gap may be formed between a pipe outer circumferential surface and yoke component inner circumferential surfaces corresponding to a position where the guide pipe and the shaft slide, and second gaps may be formed between a pipe inner circumferential surface and the shaft corresponding to positions where the guide pipe and the yoke components are in contact.

Magnetic flux acting surface parts, where an outer circumferential surface part that faces the coil is extended toward both sides in the axial direction, may be formed in the first yokes.

Also, a magnetic body may be formed in a range of no greater than 180° about a center of the shaft on a moving part outer circumferential surface that faces the yoke.

By using the linear actuator described above, the yoke components that construct the yoke part are combined on the outer circumference of a guide pipe e.g., with facing end surfaces of the first yokes in contact, facing end surfaces of the second yokes in contact, facing end surfaces of the first yokes and facing end surfaces of the second yokes in contact, or the facing end surfaces of the first yokes in close proximity. As a result, there is no gap between the facing end surfaces of the first yokes and second yokes, or even if gaps do exist, such gaps can be made as small as possible. Accordingly, leak magnetic flux from the facing yoke end surfaces and/or the proximate yoke end surfaces can be greatly reduced, so that the magnetic flux acts having been concentrated on the outer circumferential surfaces of the first yokes. Therefore, by using a small permanent magnet with high coercive force and a high operating point, it is possible to improve the output performance while miniaturizing the yoke part. Also, since it is possible to increase the interlinking magnetic flux perpendicular to the direction in which the current flows through the coil, ineffective components that reduce the thrust of the moving part (the yoke part or the shaft-linked part) are reduced, vibration in the radial direction does not occur and the magnetic flux that is produced from the permanent magnets can be effectively converted into thrust that acts upon the moving part in the axial direction, thereby improving the output performance.

Also, since the yoke components are combined on the outer circumference of the guide pipe with the first yokes facing one another, it is possible to coaxially combine the yoke components with a shaft hole diameter of the respective yoke components or the outer circumference of the guide pipe as a reference position, so that coaxial alignment of the yoke part is easy to achieve. This makes assembly easier and improves the assembly precision. Accordingly, even if the internal space of the yoke part is narrowed, interference will not occur between the shaft-linked part and the yoke part, thereby improving the operational stability of the linear actuator.

Also, by coaxially positioning the components by stacking the first yoke on one side of the permanent magnet and the second yoke on the other side and magnetizing to integrate the yoke components using magnetic attraction, a heating process that heats the attached parts and/or heats and hardens an adhesive can be omitted, so that the assembly time for the yoke part and the productivity can be increased.

A first gap is formed between a pipe outer circumferential surface and yoke component inner circumferential surfaces corresponding to a position where the guide pipe and the shaft slide, so that clearance is allowed on the outer circumferential surface side of the guide pipe depending on the usage environment, thereby improving the sliding of the shaft and the guide pipe. In addition, second gaps are formed between a pipe inner circumferential surface and the shaft corresponding to positions where the pipe outer circumferential surface and the yoke component inner circumferential surfaces are in contact, so that stress-caused distortion due to the guide pipe being pressed into the shaft holes of the yoke components can be absorbed by the second gaps and therefore has no effect on the sliding of the shaft. Accordingly, smooth relative movement between the yoke part and the shaft-linked part can be reciprocally caused in the axial direction.

Also, when magnetic flux acting surface parts, where an outer circumferential surface part that faces the coil is extended toward both sides in the axial direction, are formed in the first yokes, the magnetic flux acting surface, which is interlinked perpendicular to the current flow direction of the moving coil, extends toward both sides in the axial direction within the hollow inside the yoke part, so that it is possible to lengthen the movement stroke of the moving part toward both sides in the axial direction.

In addition, if a magnetic body is formed in a range of no greater than 180° about a center of the shaft on a moving part outer circumferential surface that faces a yoke, the moving shaft slides while being pressed onto the inner circumferential surface of the guide pipe in the longitudinal direction by the magnetic attraction that acts between the magnetic body and the yoke. Accordingly, there is no concentration of the load due to point contact at the openings of the guide pipe due to the moving shaft being inclined, so that it is possible to reduce abrasion at the contacting parts and extend the lifespan.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings:

FIGS. 1A and 1B are respectively a schematic cross-sectional view and a right elevation of a linear actuator according to a first embodiment;

FIGS. 5A and 5B are schematic cross-sectional views of an assembly process of a yoke part;

DESCRIPTION OF THE PREFERRED EMBODIMENTS

Figure 2:
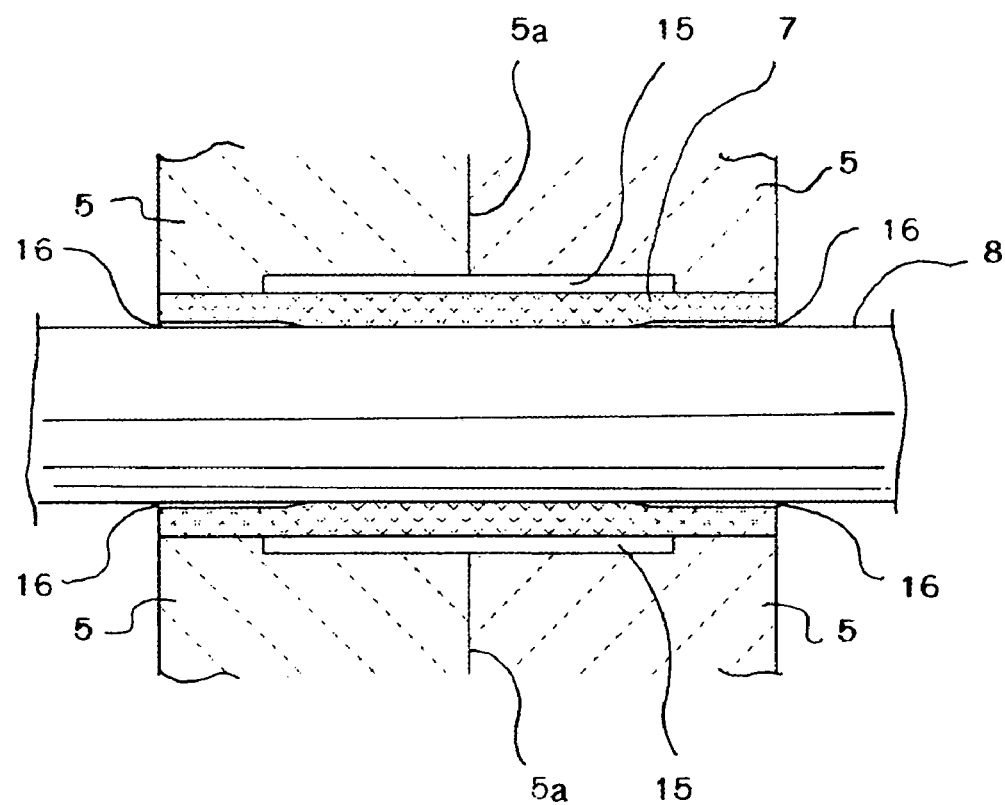
FIG. 2 is an enlarged cross-sectional view of a guide pipe in which a moving shaft has been inserted.

Preferred embodiments of a linear actuator according to the present invention will now be described with reference to the attached drawings. The linear actuator according to the present embodiments is a voice coil linear actuator, and can be widely applied to a linear actuator where thrust is produced in a moving part by an electromagnetic force that acts in a direction perpendicular to the direction in which current flows through the coil and to a magnetic field formed in a yoke part.

Out of the yoke part and a shaft-linked part, the case where the yoke part is the fixed part and the shaft-linked part is the moving part is described in the following embodiments.

First Embodiment

The overall construction of a linear actuator according to a first embodiment will now be described with reference to FIG. 1A to FIG. 6. In FIG. 1A, the yoke part (fixed part) 1 is formed by combining left and right yoke components 2, and a shaft-linked part (moving part) 3 is provided in spaces inside and outside the yoke part 1 and at a shaft core of the yoke part 1. In each yoke component 2, a ring-shaped first yoke 5 is provided adjacent to one side of a ring-shaped permanent magnet 4 and a cup-shaped second yoke 6 is provided adjacent to the other side of the permanent magnet 4. The first yoke 5 and the second yoke 6 are integrally attached to the permanent magnet 4 using adhesive. As examples, a neodymium magnet made of a neodymium-iron-boron (Ne—Fe—B) alloy or an alnico magnet made of an aluminum-nickel-cobalt (Al—Ni—Co) alloy, and the like can be used as the permanent magnet 4.

The yoke part 1 is formed by attaching the respective yoke components 2 to an outer circumference of a tubular non-magnetic guide pipe 7 so that magnetic poles formed on facing end surfaces of the respective first yokes 5 have the same polarity (i.e., the permanent magnets 4 are disposed so that the same poles face one another) and contact is made between at least one of respective end surfaces 5a of the first yokes 5 and respective end surfaces 6a of the second yokes 6. That is, one of an arrangement where only the facing end surfaces 5a of the first yokes 5 are in contact, an arrangement where only the facing end surfaces 6a of the second yokes 6 are in contact, and an arrangement where the facing end surfaces 5a of the first yokes 5 and the facing end surfaces 6a of the second yokes 6 are in contact (the arrangement shown in FIG. 1A) is used. In the present embodiment, poles with the same polarity are formed at facing end surfaces 5a of the first yokes 5 or the facing end surfaces 6a of the second yokes 6, and to suppress magnetic repulsion between the left and right yoke components 2, the yoke components 2 are integrally fixed by screwing in an assembly screw 17 with the end surfaces 6a of the second yokes 6 in contact. When a tightening force is produced for the left and right yoke components 2 by pressing the guide pipe 7 into a shaft hole of the respective yoke components 2, fixing with the assembly screw 17 is unnecessary. In either case, there is no gap between the facing end surfaces 5a of the first yokes 5 or between the facing end surfaces 6a of the second yokes 6, or even if gaps do exist, such gaps can be made as small as possible. Accordingly, leak magnetic flux can be reduced in the magnetic circuit formed in the yoke part 1, and by effectively using the magnetic flux of the permanent magnets 4, it is possible to improve the output performance while miniaturizing the yoke part 1.

In the present embodiment, the guide pipe 7 is fitted into the shaft hole of the ring-shaped first yokes 5 that are in contact on the right and left sides. As examples, a metal pipe made of a non-magnetic material, a resin pipe, a ceramic cut pipe, an oil-retaining bearing made of sintered metal, and a direct bearing can be used as the guide pipe 7.

The shaft-linked part 3 includes a moving shaft 8, a coil support 9 that is linked to the moving shaft 8, a coil bobbin 10 cantilevered on the coil support 9, and a moving coil 11 that is wound around the coil bobbin 10. The moving shaft 8 is inserted into and supported by the guide pipe 7 so as to be able to slide. There are no limitations on the material of the moving shaft 8, but a non-magnetic material such as a resin material, a non-magnetic metal material, or ceramic is preferable. in order to prevent leak magnetic flux and avoid decreases in thrust. The coil bobbin 10 is provided in a hollow 12 formed between the outer circumferential surface of the first yokes 5 and the inner circumferential surface of the second yokes 6. The moving coil 11 is wound around the coil bobbin 10. The coil bobbin 10 is connected to and cantilevered on one end of the coil support 9. The other end of the coil support 9 is attached to the moving shaft 8 outside one of the second yokes 6 via openings 13 formed in the second yoke 6.

In the present embodiment, the coil bobbin 10 is cantilevered on a single coil support 9 provided outside one of the second yokes 6, but it is possible to provide a plurality of coil supports 9 (i.e., on both sides) and to support the coil bobbin 10 at both ends. To prevent leak magnetic flux and avoid decreases in thrust, a non-magnetic metal material, a resin material, or the like is favorably used as the material of the coil support 9. The linking part of the coil support 9 and coil bobbin 10 may be any linking construction such as screwing, bolting, snap fitting (engaging convexes and concaves), and welding.

In FIG. 1B, the openings 13 are formed at a plurality of positions in a circumference of one second yoke 6, with a lead wire 14 that carries current to the moving coil 11 being disposed along the linked part of the coil bobbin 10 and the coil support 9 to outside the yoke part 1. By doing so, there is no risk of the lead wire 14 obstructing movement of the shaft-linked part 3 or of the wire being broken. In addition, through-holes may be provided in the coil support 9 to reduce the fluid (air, water, oil, etc.) resistance that accompanies reciprocal movement of the shaft-linked part 3. As necessary, the second yokes 6 may be covered with a cover with the coil support 9 being enclosed so as to be movable in an enclosed space.

In FIG. 2, for the guide pipe 7 pressed into the shaft hole in the left and right yoke components 2 (in the present embodiment, the first yokes 5), a first gap 15 is formed between the outer circumferential surface of the guide pipe 7 and the inner circumferential surfaces of the first yokes 5 corresponding to a position where the pipe inner circumferential surface and an outer circumferential surface of the moving shaft slide (i.e., a position that is the guide surface for the moving shaft 8). By doing so, since clearance is allowed on the outer circumferential surface side of the guide pipe 7 depending on the usage environment, the sliding of the moving shaft 8 that slides within the guide pipe is improved. In addition, second gaps 16 are formed between the inner circumferential surface of the guide pipe 7 and the moving shaft 8 in accordance with the position where the outer circumferential surface of the guide pipe 7 and the inner circumferential surface of the first yokes 5 are in contact. By doing so, stress-caused distortion due to the guide pipe 7 being pressed into the shaft hole of the first yokes 5 can be absorbed by the second gaps 16 and so has no effect on the sliding of the moving shaft 8.

In this way, the guide pipe 7 pressed into the shaft hole of the first yokes 5 does not become sandwiched on both sides between the outer circumferential surface of the moving shaft 8 inserted inside the guide pipe 7 and the inner circumferential surfaces of the first yokes 5. Accordingly, it is possible to realize smooth reciprocal movement in the axial direction of the moving shaft 8 inserted into the guide pipe 7.

In FIG. 1A, in the yoke part 1, the magnetic flux produced in the left and right yoke components 2 from the N pole sides of the permanent magnets 4 passes the second yokes 6, is perpendicularly bent in the radial direction due to repulsion of the magnetic flux at the side surfaces 6a, crosses the gap (the hollow 12) in which the moving coil 11 is provided and enters the first yokes 5, is perpendicularly bent in the shaft direction due to repulsion of the magnetic flux at the end surfaces 5a, and returns to the S pole sides of the permanent magnets 4, so that magnetic circuits are separately formed (see the arrows in FIG. 1A). When current is supplied through the lead wire 14 to the moving coil 11, thrust is produced in the moving coil 11 (the shaft-linked part 3) by the electromagnetic force received in a direction (the axial direction) that is perpendicular to the direction of the current flowing through the coil (a perpendicular direction to the plane of the paper) and to the magnetic field formed in the radial direction from the second yokes 6 toward the first yokes 5. By switching the direction of the current flowing through the moving coil 11, the shaft-linked part 3 is moved reciprocally in the axial direction.

Figure 3A:
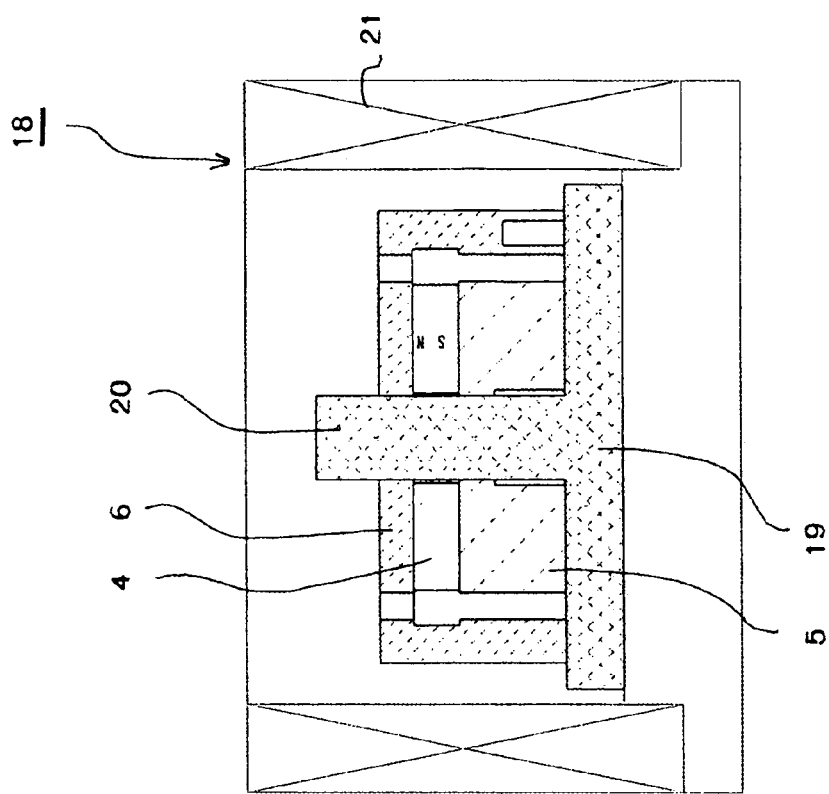
FIGS. 3A and 3B are schematic cross-sectional views of a magnetizing process that uses a magnetizing device.
Figure 3B:
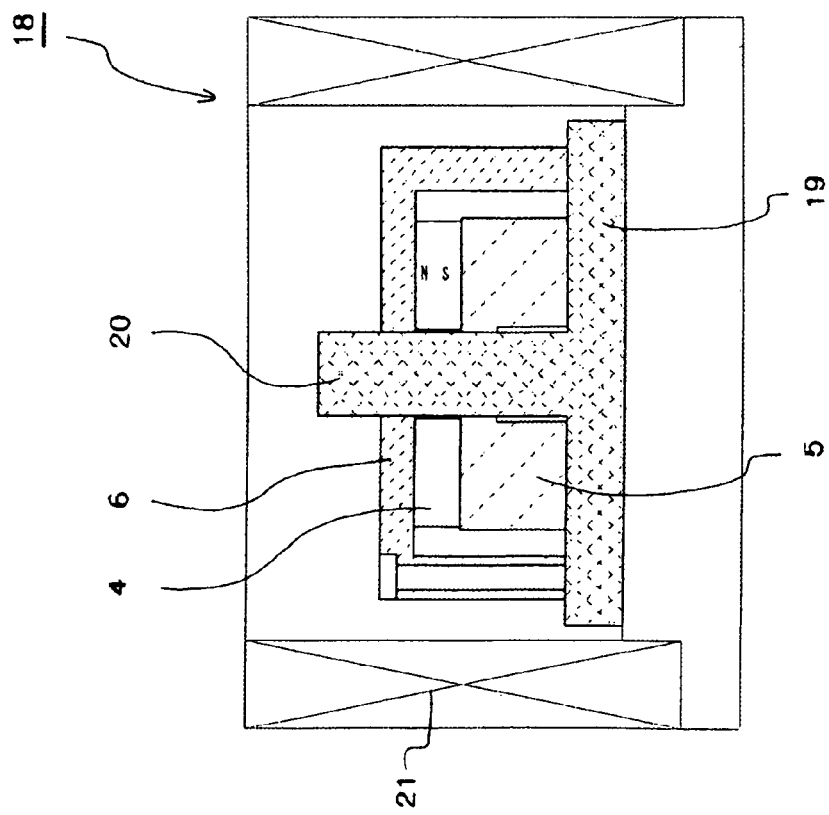

Next, a method of manufacturing the linear actuator described above will be described with reference to FIG. 3A to FIG. 5. FIGS. 3A and 3B show a process that magnetizes the left and right yoke components 2 shown in FIG. 1A using a magnetizing device. The left and right yoke components 2 are positioned by placing column-shaped parts 20 of positioning jigs 19 composed of a non-magnetic material in engagement with the shaft holes. It should be noted that although the permanent magnets 4 and the first and second yokes 5, 6 that compose the yoke components 2 may be attached in advance, this is not essential. By passing a current through the magnetizing coils 21 attached to a periphery of the positioning jigs 19, magnetizing is carried out so that the polarity is the same for the first yokes 5 on the left and right sides. By magnetizing in a state where the first yokes 5, the permanent magnets 4, and the second yokes 6 are stacked in engagement with the column-shaped parts 20 of the positioning jigs 19, the yoke components 2 are formed with the parts being integrated in a state where coaxial alignment is maintained by the magnetic attraction of the permanent magnets 4.

Next, the assembly process for the yoke part 1 will be described with reference to FIG. 4 and FIG. 5.

Figure 4A:
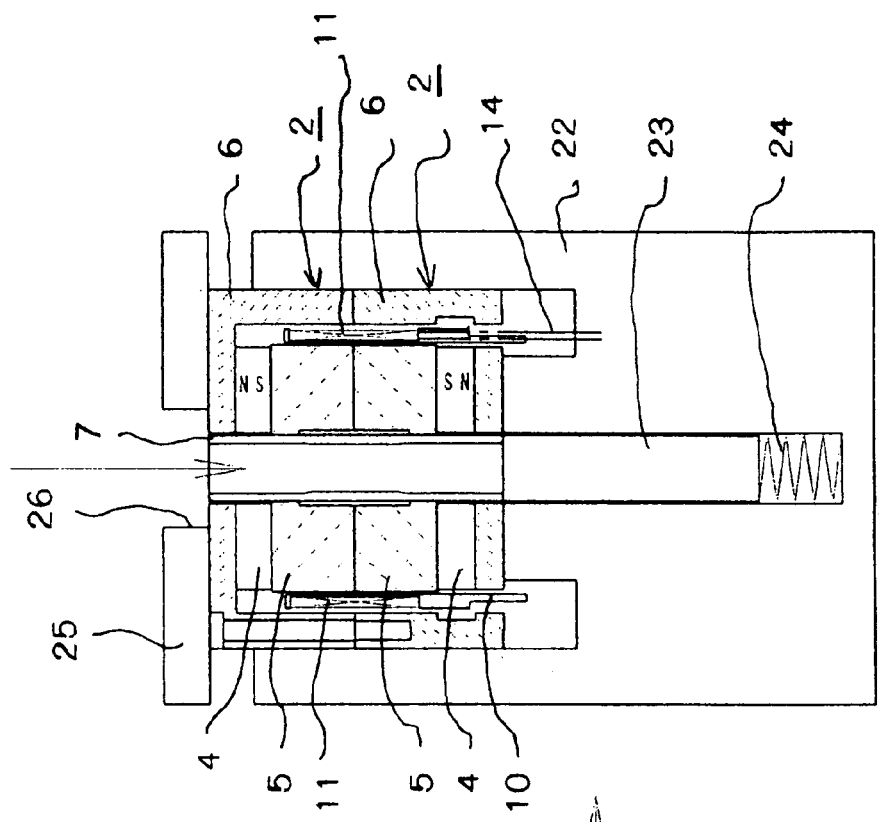
FIGS. 4A and 4B are schematic cross-sectional views of an assembly process of a yoke part.

In FIG. 4A, the yoke part 1 is assembled by combining the yoke components 2 above and below on a yoke assembly jig 22 composed of a non-magnetic material. That is, the yoke components 2 are combined with one another on a yoke combining jig 22 in a state where the end surfaces 5a of the first yokes 5 and the end surfaces 6a of the second yokes 6 are disposed so as to face another and where the coil bobbin 10 around which the moving coil 11 has been wound has been inserted into the hollow 12 between the first yokes 5 and the second yokes 6.

In a center of a base of the yoke assembly jig 22, a positioning pin 23 is erected and pushed upward by a spring 24. The lower yoke component 2 is supported with the second yoke 6 thereof in contact with a jig base and a jig inner wall. The shaft axes of the upper and lower yoke components 2 are aligned by fitting the positioning pin 23 into the shaft hole, and in a state where the coaxial alignment is maintained, the second yoke 6 of the upper yoke component 2 is pressed by a pressing tool 25 so that the end surfaces 5a of the first yokes 5 and the end surfaces 6a of the second yokes 6 are placed in contact and pressed together. It should be noted that pressure may be applied until the end surfaces 5a of the respective first yokes 5 or the end surfaces 6a of the respective second yokes 6 are in contact.

Figure 4B:
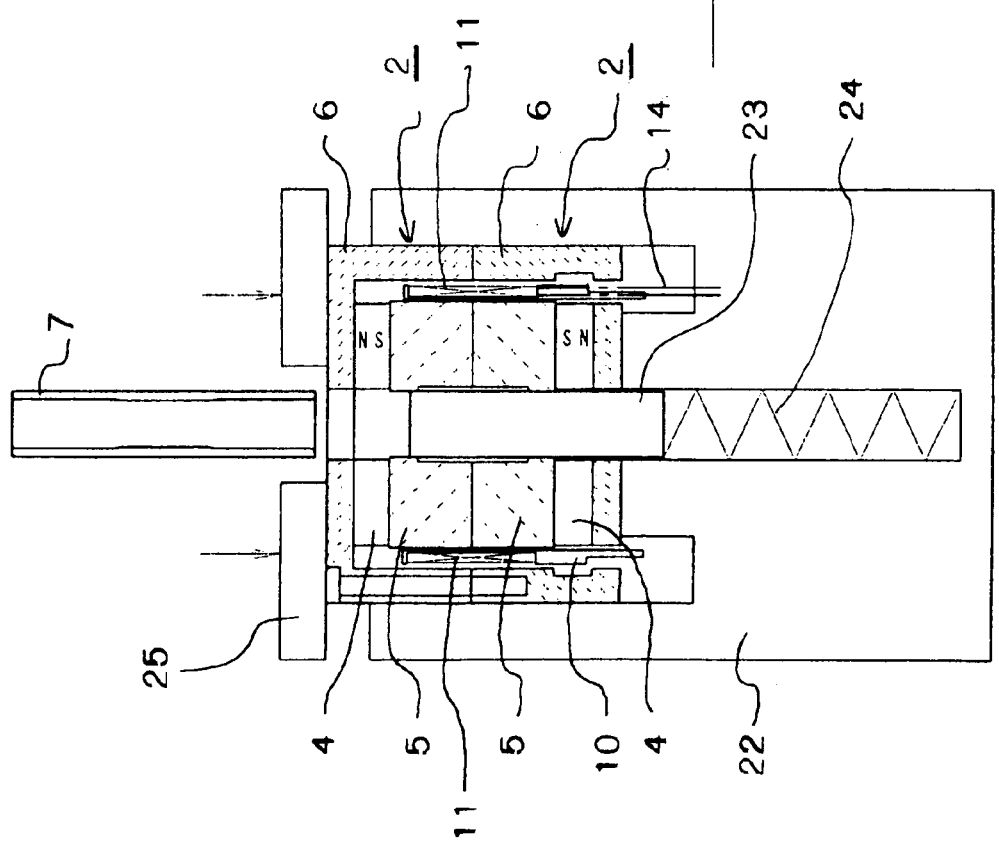

Next, in FIG. 4B, with the pressing tool 25 still pressing the second yoke 6 of the upper yoke component 2, the guide pipe 7 is inserted into the shaft hole of the yoke part 1 that is exposed at a central opening 26 of the pressing tool 25. In a state where a front end of the guide pipe 7 is in contact with an upper end of the positioning pin 23, the guide pipe 7 is fitted into the shaft hole of the yoke part 1 while the spring 24 is compressed downward. If the guide pipe 7 is pressed into the shaft hole of the yoke part 1, the upper and lower yoke components 2 can be integrally combined with a high degree of coaxial alignment being maintained with a center axis of the guide pipe 7.

Next, to strongly maintain the attachment of the yoke components 2 of the yoke part 1, as shown in FIGS. 5A and 5B, it is possible to fit the assembly screw 17 into a screw hole 27 of the second yoke 6 from which the pressing tool 25 has been removed and thereby screw the yoke components 2 together. After tightening the screw, the yoke part 1 is removed from the yoke assembly jig 22 and the shaft-linked part 3 is combined with the yoke part 1. That is, in FIG. 1A, the moving shaft 8 is fitted into the guide pipe 7 from the right side, and the front ends of the coil support 9 attached to a rear end of the moving shaft 8 are inserted into the hollow 12 inside the yoke part 1 from the openings 13 of the second yoke 6 and are linked to the coil bobbin 10. Here, screwing, bolting, snap fitting, welding, or the like may be used as the linking construction. By doing so, the shaft-linked part 3 is combined with the yoke part 1, thereby completing the linear actuator.

As described with reference to FIG. 2, the guide pipe 7 does not become sandwiched between the outer circumferential surface of the moving shaft 8 and the inner circumferential surfaces of the first yokes 5, so that smooth reciprocal movement of the moving shaft 8 in the axial direction can be realized.

Figure 6:
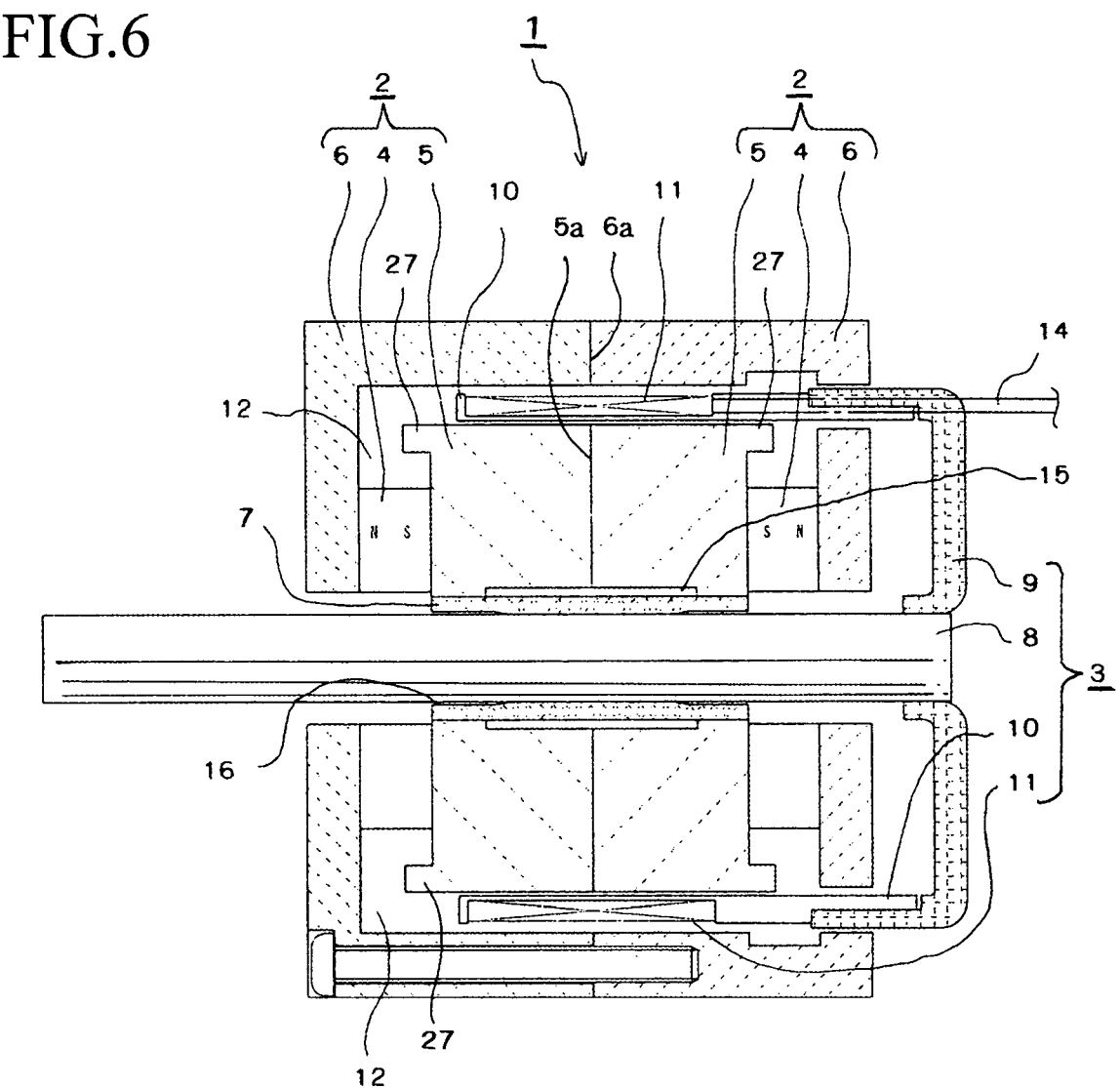
FIG. 6 is a schematic cross-sectional view of a linear actuator showing a modification to FIG. 1.

It should be noted that as shown in FIG. 6, magnetic flux acting surface parts 27, where the outer circumferential surface that faces the moving coil 11 is extended toward both sides in the axial direction, may be formed in the first yokes 5. The magnetic flux acting surface, which is interlinked perpendicular to the current flow direction of the moving coil 11, therefore extends toward both sides in the axial direction, so that it is possible to lengthen the movement stroke of the shaft-linked part 3 toward both sides in the axial direction.

Second Embodiment

Next, another embodiment of a linear actuator will be described. Components that are the same as in the first embodiment have been assigned the same numerals and description thereof has been omitted, with the following description focusing on the different constructions.

Figure 7:
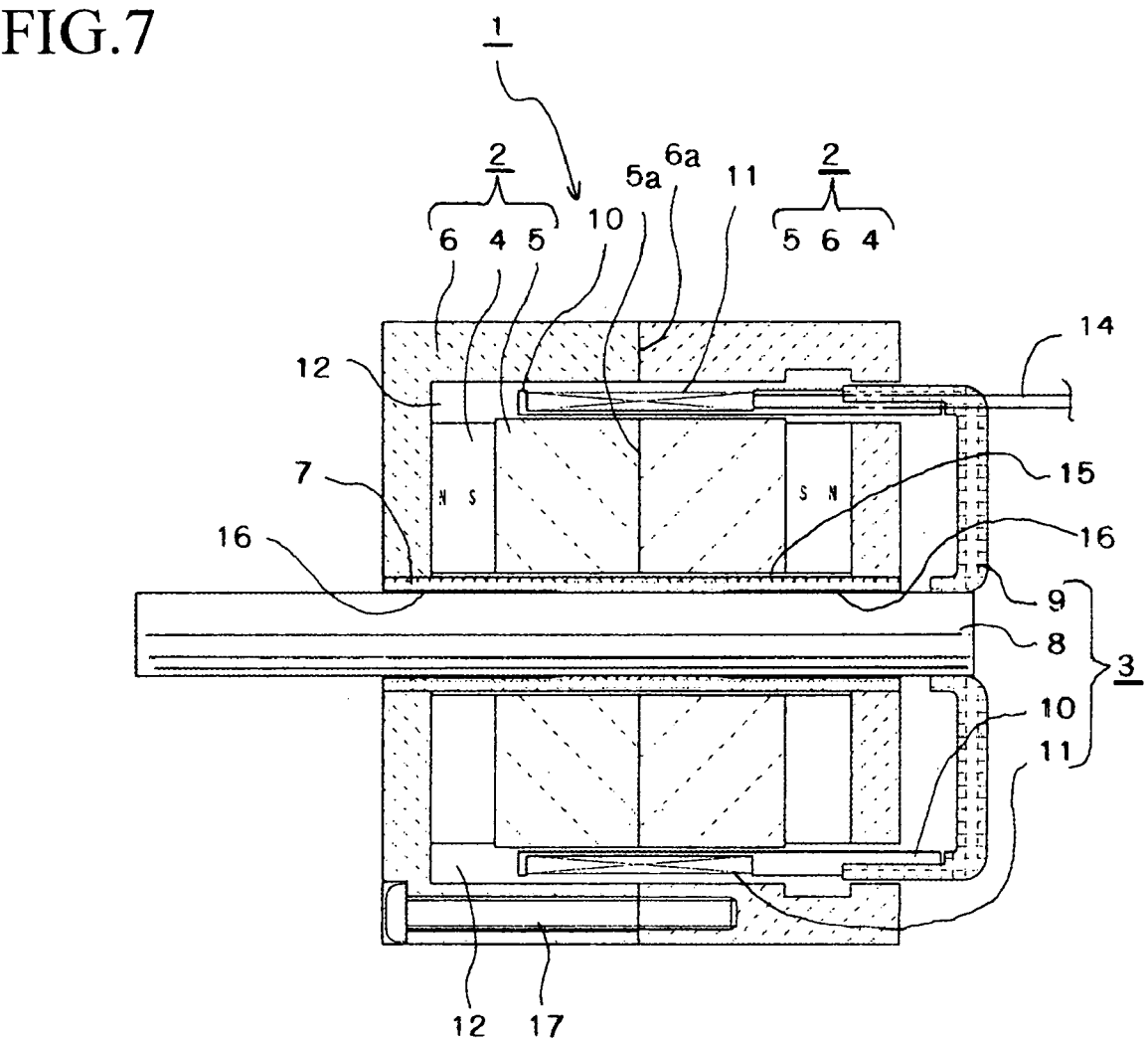
FIG. 7 is a schematic cross-sectional view of a linear actuator according to a second embodiment.

In FIG. 7, the pressing-in construction for the guide pipe 7 pressed into the shaft hole of the yoke part 1 differs. That is, the positions in the axial direction of the first gap 15 and the second gaps 16 that are formed in the inner circumferential surface side and the outer circumferential surface side of the guide pipe 7 differ. In the present embodiment, the guide pipe 7 is pressed into shaft holes in the second yokes 6 in the left and right yoke components 2. In the guide pipe 7 pressed into the shaft holes of the yoke components 2 (specifically in the second yokes 6 in the present embodiment), the first gap 15 is formed between the outer circumferential surface of the guide pipe 7 and the inner circumferential surfaces of the first yokes 5 and also between the outer circumferential surface of the guide pipe 7 and the inner circumferential surfaces of the permanent magnets 4, thereby corresponding to an area in the axial direction including a position where the pipe inner circumferential surface and the moving shaft outer circumferential surface slide (a position of a guide surface for the moving shaft 8). The second gaps 16, where the guide pipe 7 and the moving shaft 8 are not in sliding contact, are formed corresponding to positions where the outer circumferential surface of the guide pipe 7 and the inner circumferential surface of the second yokes 6 are in contact. By doing so, the sliding of the moving shaft 8 is improved since clearance is allowed toward the inner and outer circumferential surfaces of the guide pipe 7. The rest of the construction and assembly process is the same.

Third Embodiment

Next, another embodiment of a linear actuator will be described. Components that are the same as in the first embodiment have been assigned the same numerals and description thereof has been omitted, with the following description focusing on the different constructions.

Figure 8:
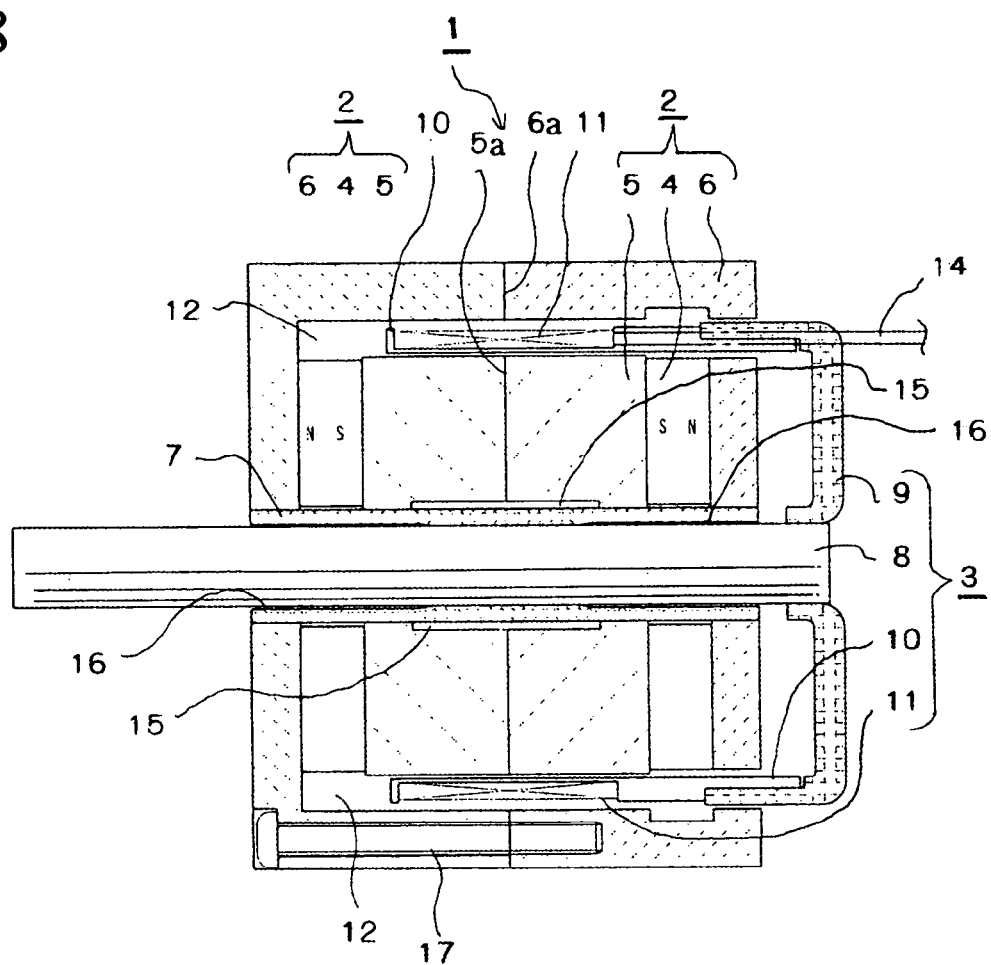
FIG. 8 is a schematic cross-sectional view of a linear actuator according to a third embodiment.

FIG. 8 shows a different pressing-in construction for the guide pipe 7 pressed into the shaft hole of the yoke part 1. That is, in the present embodiment, the guide pipe 7 is pressed into shaft holes in the first yokes 5 and the second yokes 6 in the left and right yoke components 2. When the guide pipe 7 is pressed into the shaft holes of the yoke components 2 (in the present embodiment, the first yokes 5 and the second yokes 6), the first gap 15 is formed between the outer circumferential surface of the guide pipe 7 and the inner circumferential surfaces of the first yokes 5 corresponding to an area in the axial direction including a position where the pipe inner circumferential surface and the moving shaft outer circumferential surface slide (a position that is a guide surface for the moving shaft 8). In addition, the second gaps 16 are formed between the guide pipe 7 and the moving shaft 8 corresponding to a position where (i) the pipe outer circumferential surface and inner circumferential surfaces of the first yokes 5 and (ii) the pipe outer circumferential surface and the inner circumferential surfaces of the second yokes 6 are respectively in contact. By doing so, the sliding of the moving shaft 8 is improved since clearance is allowed to the inner and outer circumferential surfaces of the guide pipe 7. In this embodiment, the attachment process for attaching the first yokes 5, the permanent magnets 4, and the second yokes 6 that compose the respective yoke components 2 can be omitted. This is because the guide pipe 7 is pressed into and fixed to the shaft hole of the first yoke 5 and the shaft hole of the second yoke 6 provided on both sides of the permanent magnet 4, with it being possible to strongly fix the respective components at positions in the axial direction of the yoke components 2 so as to counteract the repulsion between the magnetic poles. The rest of the construction and assembly process is the same.

Fourth Embodiment

Next, another embodiment of a linear actuator will be described. Components that are the same as in the first embodiment have been assigned the same numerals and description thereof has been omitted, with the following description focusing on the different constructions.

Figure 9:
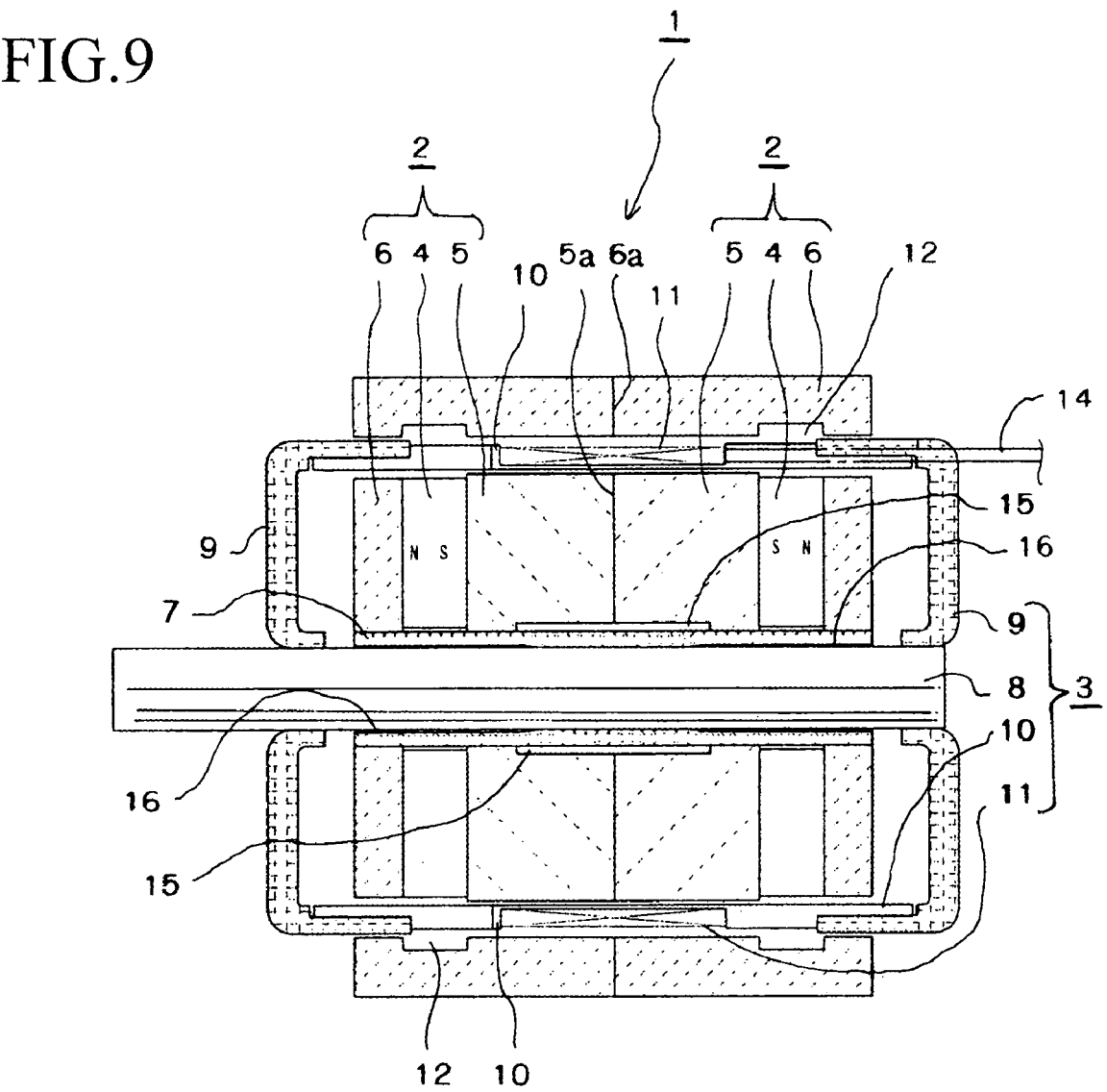
FIG. 9 is a schematic cross-sectional view of a linear actuator according to a fourth embodiment.

In FIG. 9, the construction of the shaft-linked part 3 differs. That is, a construction is shown where the coil bobbin 10 is supported and held by two coil supports 9 provided on both sides outside the second yokes 6.

To combine the shaft-linked part 3 to the yoke part 1, first ends of the coil supports 9 are attached to the moving shaft 8, which has been fitted into the guide pipe 7, at both sides in the axial direction The other ends of the coil supports 9 are respectively introduced into the hollow 12 inside the yoke part 1 from the openings 13 and linked to the coil bobbin 10. Here, screwing, bolting, snap fitting, and welding may be used as the linking construction. By doing so, the posture of the coil bobbin 10 disposed inside the yoke part 1 is stabilized so that movement toward both sides in the axial direction of the shaft-linked part 3 becomes smooth.

It should be noted that the pressing construction of the guide pipe 7 pressed into the shaft hole of the yoke part 1 is as shown in FIG. 8, with the guide pipe 7 being pressed into shaft holes in the first yokes 5 and the second yokes 6 in the left and right yoke components 2 and clearance being allowed toward the inner and outer surface of the guide pipe, so that the sliding of the moving shaft 8 is improved. In this embodiment also, the attachment process for attaching the first yokes 5, the permanent magnets 4, and the second yokes 6 that compose the respective yoke components 2 can be omitted. This is because the guide pipe 7 is pressed into and fixed to the shaft hole of the first yoke 5 and the shaft hole of the second yoke 6 provided on both sides of the permanent magnet 4, with it being possible to strongly fix the respective components at positions in the axial direction of the yoke components 2 so as to counteract the repulsion between the magnetic poles. The rest of the construction and assembly process is the same.

Fifth Embodiment

Next, another embodiment of a linear actuator will be described. Components that are the same as in the first embodiment have been assigned the same numerals and description thereof has been omitted, with the following description focusing on the different constructions.

Figure 10:
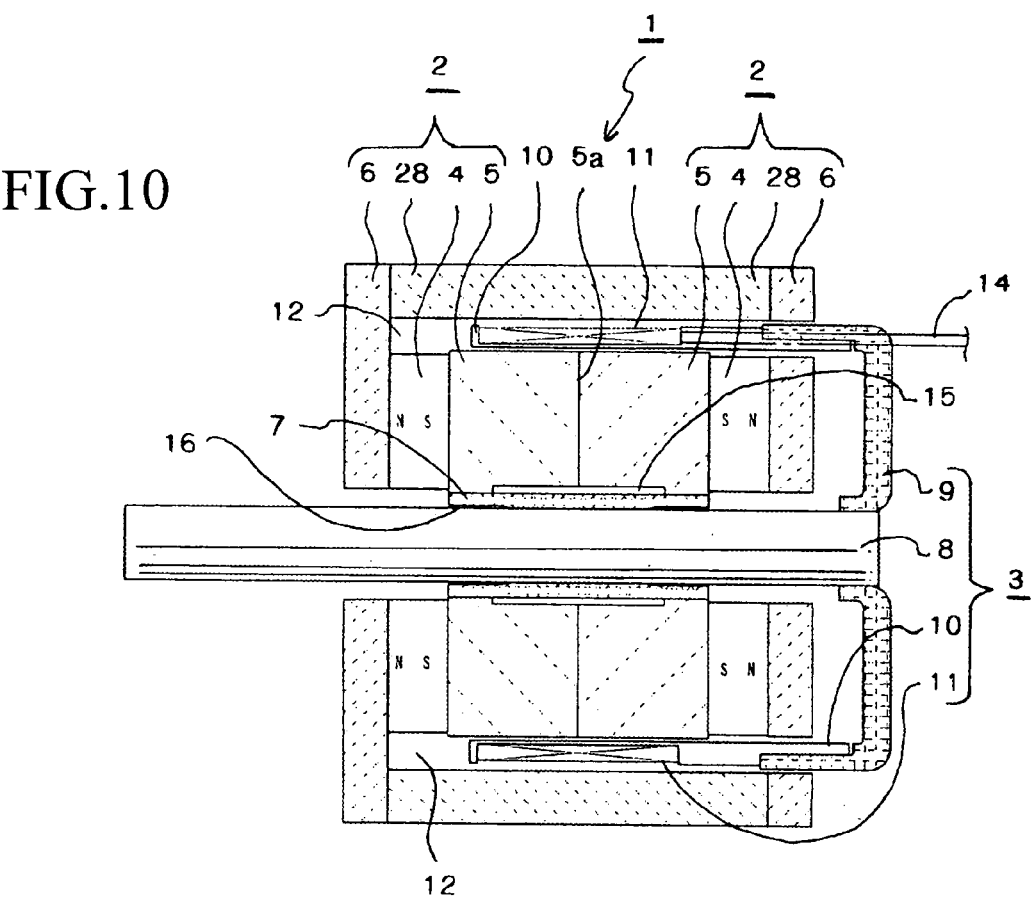
FIG. 10 is a schematic cross-sectional view of a linear actuator according to a fifth embodiment.

The construction of the yoke part 1 will be described with reference to FIG. 10. In each yoke component 2, the ring-shaped first yoke 5 is provided on one side of the ring-shaped permanent magnet 4 and the ring-shaped second yoke 6 that has a larger diameter than the first yoke 5 is provided on the other side of the ring-shaped permanent magnet 4. The construction differs to those described above in that the yoke components 2 are combined on the outer circumference of the tubular non-magnetic guide pipe 7 with a tubular third yoke 28 disposed between the second yokes 6 and magnetic poles formed on the end surfaces 5a of the first yoke 5 that face one another having the same polarity. In the present embodiment, the first yokes 5 are combined with the coaxial alignment with respect to the guide pipe 7 being maintained, so that combining can be carried out with the coaxial alignment of the permanent magnets 4 and the second yokes 6 that are stacked on and integrally formed with the first yokes 5 also being maintained and the coaxial alignment of the third yoke 28 attached between the second yokes 6 also being maintained with high precision. The pressing-in construction for the guide pipe 7 pressed into the shaft hole of the yoke part 1 is the same as in FIG. 1, so that the construction of the shaft-linked part 3 and the method of attaching the shaft-linked part 3 to the yoke part 1 is the same.

In this case, the coil bobbin 10 is cantilevered on the coil support 9, but the coil bobbin 10 may be supported at both ends. In the same way as in FIG. 6, magnetic flux acting surface parts 27, where the outer circumferential surface that faces the moving coil 11 is extended toward both sides in the axial direction, may be formed in the first yokes 5.

Also, as described earlier, with the yoke part 1, by coaxially positioning the components by,stacking the first yoke 5 on one side of the permanent magnet 4 and the second yoke 6 on the other side and magnetizing using the magnetizing device 18 shown in FIG. 3, the yoke components 2 may be integrally formed using magnetic attraction.

Sixth Embodiment

Next, another embodiment of a linear actuator will be described. Components that are the same as in the first embodiment have been assigned the same numerals and description thereof has been omitted, with the following description focusing on the different constructions.

Figure 11B:
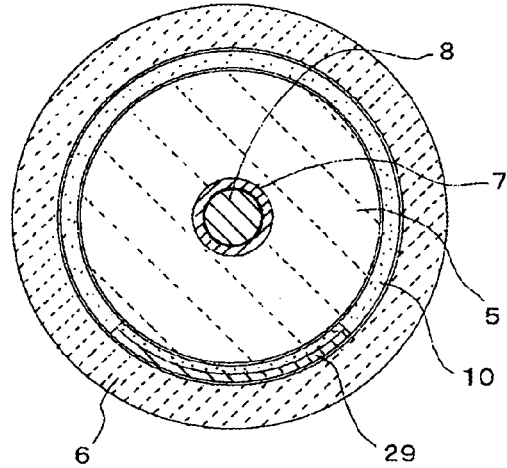
FIGS. 11A and 11B are respectively a cross-sectional view in an axial direction and a cross-sectional view in a radial direction of a linear actuator according to a sixth embodiment.
Figure 11A:
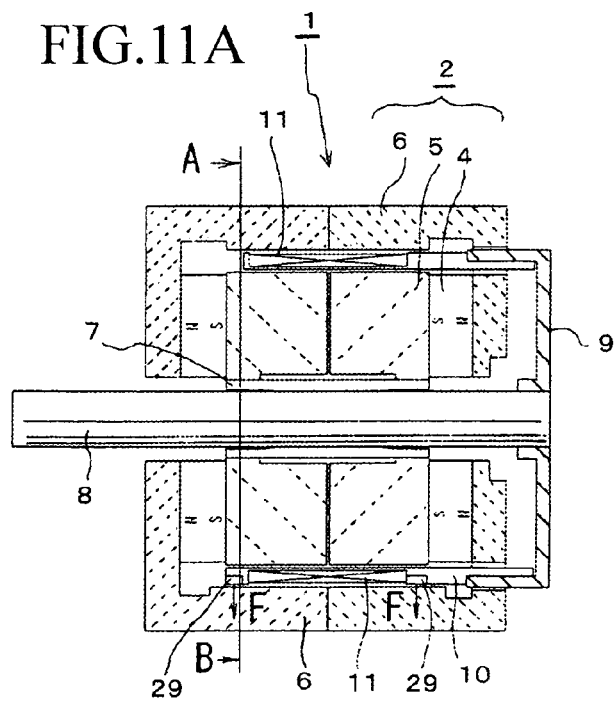

In FIGS. 11A and 11B, the construction differs in that a magnetic body is provided on the moving shaft outer circumferential surface that faces the yoke part 1 in a range of an angle of 180° or less about the center of the moving shaft. In FIG. 11A, soft magnetic bodies (for example, S45C (carbon steel tubes for machine structural purposes), SS400 (rolled steel for structural purposes) or the like) 29 are provided in a range of an angle of 180° or less about the center of the moving shaft at both ends in the axial direction of the coil bobbin 10 around which the moving coil 11 is wound. In FIG. 11B, a soft magnetic body 29 is formed of an arc-shaped plate and is attached along on outer circumference of the coil bobbin 10. The soft magnetic bodies 29 are provided facing the inner circumferential surface of the second yokes 6 of the left and right yoke components 2. Accordingly, the moving shaft 8 slides while being pressed onto the inner circumferential surface of the guide pipe 7 in the longitudinal direction by the magnetic attraction F (see FIG. 11A) that acts between the soft magnetic body 29 and the second yokes 6. Accordingly, there is no concentration of the load due to point contact at the openings of the guide pipe 7 due to the moving shaft 8 being inclined, so that it is possible to reduce abrasion at the contacting parts and extend the lifespan. The rest of the construction and assembly process is the same as in the first embodiment.

Figure 12:
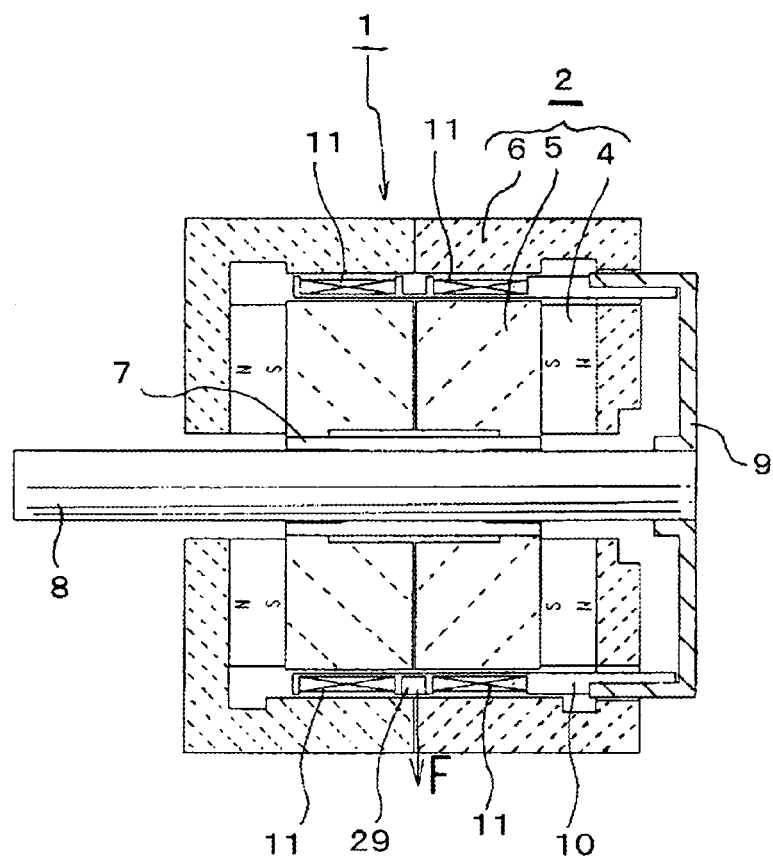
FIG. 12 is a schematic cross-sectional view of a linear actuator showing a modification to FIG. 11.
Figure 13:
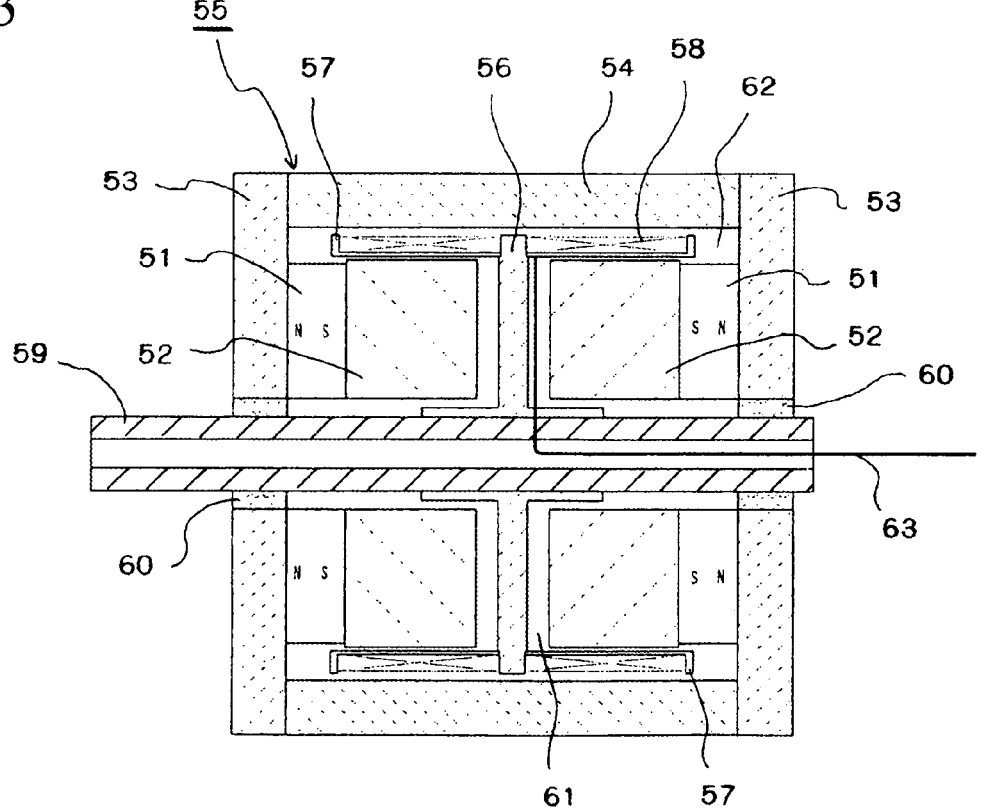
FIG. 13 is a schematic cross-sectional view showing a conventional linear actuator.
Figure 14:
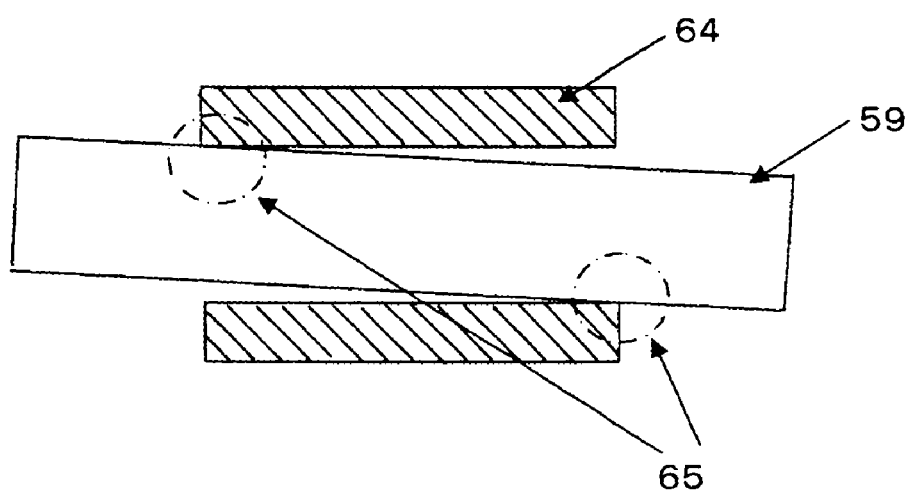
FIG. 14 is a schematic diagram showing point contact between an output shaft and a guide pipe of conventional linear actuator.

FIG. 12 shows a modification to the arrangement of the magnetic body provided in the moving part. In this example, moving coils 11 that are wound around the coil bobbin 10 are separately provided at two positions, with the soft magnetic body 29 being provided between the moving coils 11. For this reason, in the operating range of the moving part, the soft magnetic body 29 always faces the first yokes 5 and/or the second yokes 6, so that even if the moving part is moved in the axial direction, there is no change in the magnetic resistance of the magnetic circuit including the soft magnetic body 29. As a result, there is no change in the magnetic attraction that acts on the soft magnetic body 29, so cogging does not occur between the moving part and the fixed part. Accordingly, the moving shaft 8 slides while being pressed onto the inner circumferential surface of the guide pipe 7 in the longitudinal direction by the magnetic attraction F (see FIG. 12) that acts between the soft magnetic body 29 and the second yokes 6. Accordingly, there is no concentration of the load due to point contact at the openings of the guide pipe 7 due to the moving shaft 8 being inclined, so that it is possible to reduce abrasion at the contacting parts and extend the lifespan.

It should be noted that the linear actuator is not limited to the various embodiments described above, and it is possible to use a design where the shaft-linked part 3 is the fixed part and the yoke part 1 is the moving part. In this case, to eliminate leak magnetic flux in the yoke part 1, the internal hollow is omitted and the linear actuator is made smaller and lighter, so that various improvements, such as the ability to achieve a reciprocal operation with low power consumption, become possible.

What is claimed is:

1. A linear actuator that produces thrust in a moving part by electromagnetic force that acts in a direction perpendicular to a direction of a current flowing in a coil and to a magnetic field formed in a yoke part, the linear actuator comprising:

a yoke part where yoke components, where a hollow is formed between an outer circumferential surface of a first yoke provided on one side of a ring-shaped permanent magnet and an inner circumferential surface of a second yoke provided on another side of the ring-shaped permanent magnet, are combined on an outer circumference of a guide pipe with end surfaces of the first yokes and/or end surfaces of the second yokes being in contact and magnetic poles formed in facing yoke surfaces having a same polarity; and a shaft-linked part where a coil bobbin, which is disposed in the hollow of the yoke part and around which a coil has been wound, and a shaft inserted into the guide pipe are linked, wherein by switching the direction of the current flowing in the coil, relative movement between the yoke part and the shaft-linked part is reciprocally caused in an axial direction.

2. A linear actuator that produces thrust in a moving part by electromagnetic force that acts in a direction perpendicular to a direction of a current flowing in a coil and to a magnetic field formed in a yoke part, the linear actuator comprising:

a yoke part produced by combining, on an outer circumference of a guide pipe, yoke components in each of which a first yoke is provided on one side of a ring-shaped permanent magnet and a second yoke with a larger diameter than the first yoke is provided on another surface of the ring-shaped permanent magnet, a hollow being formed between an inner circumferential surface of a tubular third yoke, which is disposed between the second yokes of the yoke components, and outer circumferential surfaces of the first yokes, and magnetic poles formed in end surfaces of the adjacent first yoke surfaces having a same polarity; and a shaft-linked part where a coil bobbin, which is disposed in the hollow of the yoke part and around which a coil has been wound, and a shaft inserted into the guide pipe are linked, wherein by switching the direction of the current flowing in the coil, relative movement between the yoke part and the shaft-linked part is reciprocally caused in an axial direction.

3. A linear actuator according to claim 1, wherein the shaft-linked part includes one or a plurality of coil supports, one end of each of which passes through openings formed in at least one of the second yokes and is connected to the coil bobbin and another end of each of which is linked to the shaft.

4. A linear actuator according to claim 1, wherein in the yoke part, yoke components, which have been integrated by magnetic attraction by magnetizing in a coaxially positioned state where the first yoke has been stacked on one end of the permanent magnet and the second yoke has been stacked on another end of the permanent magnet, are combined on the outer circumference of the guide pipe.

5. A linear actuator according to claim 1, wherein in the yoke part, a first gap is formed between a pipe outer circumferential surface and yoke component inner circumferential surfaces corresponding to a position where the guide pipe and the shaft slide, and second gaps are formed between a pipe inner circumferential surface and the shaft corresponding to positions where the guide pipe and the yoke components make contact.

6. A linear actuator according to claim 1, wherein magnetic flux acting surface parts, where an outer circumferential surface part that faces the coil is extended toward both sides in the axial direction, are formed in the first yokes.

7. A linear actuator according to claim 1, wherein a magnetic body is formed in a range of no greater than 180° about a center of the shaft on a moving part outer circumferential surface that faces the yoke.

* * * * *